US012395357B2

(12) United States Patent
Cambou et al.

(10) Patent No.: US 12,395,357 B2
(45) Date of Patent: Aug. 19, 2025

(54) INDIVIDUAL DIGITAL ACCESS WITH TERNARY STATES AND ONE-WAY UNCLONABLE FUNCTIONS TO PROTECT DIGITAL FILES

(71) Applicant: Arizona Board of Regents on Behalf of Northern Arizona University, Flagstaff, AZ (US)

(72) Inventors: Bertrand F. Cambou, Flagstaff, AZ (US); Donald Telesca, Rome, NY (US); H. Shelton Jacinto, Rome, NY (US)

(73) Assignee: ARIZONA BOARD OF REGENTS ON BEHALF OF NORTHERN ARIZONA UNVERSITY, Flagstaff, AZ (US)

( * ) Notice: Subject to any disclaimer, the term of this patent is extended or adjusted under 35 U.S.C. 154(b) by 382 days.

(21) Appl. No.: 17/991,706

(22) Filed: Nov. 21, 2022

(65) Prior Publication Data

US 2023/0163980 A1    May 25, 2023

Related U.S. Application Data

(60) Provisional application No. 63/281,577, filed on Nov. 19, 2021.

(51) Int. Cl.
*H04L 9/32* (2006.01)
*H04L 9/08* (2006.01)
*H04L 9/40* (2022.01)

(52) U.S. Cl.
CPC .......... *H04L 9/3278* (2013.01); *H04L 9/0869* (2013.01); *H04L 63/0428* (2013.01)

(58) Field of Classification Search
CPC .. H04L 9/0869; H04L 9/3278; H04L 63/0428
See application file for complete search history.

(56) References Cited

U.S. PATENT DOCUMENTS 8,782,396 B2     7/2014  Ziola et al.
2016/0156474 A1  6/2016  Lee et al.
(Continued)

OTHER PUBLICATIONS

Y. Zhu et al., "Extended Protocol Using Keyless Encryption Based on Memristors," In Science and Information Conference, pp. 494-510. Springer, Cham, 2020.
(Continued)

*Primary Examiner* — Gil H. Lee
(74) *Attorney, Agent, or Firm* — Quarles & Brady LLP

(57) ABSTRACT

Methods and systems for managing access to encrypted digital files are proposed. A remote or client device including an array of physical unclonable function (PUF) devices is provided. A server device has an image of the PUF, with previously measured responses. The server device randomly selects a set of responses from a first list PUF devices in its image. The server device then generates masking data to select among the first list to generate response bitstream. The response bitstream is used to encrypt a file, which sent to the client for storage. The random number is also sent. Later, the server generates an encrypted message digest from which the client can retrieve the masking data, which is used with the random number to generate a response bitstream from the client PUF to decrypt the file.

15 Claims, 4 Drawing Sheets

(56) References Cited

U.S. PATENT DOCUMENTS

| | | | |
|---|---|---|---|
| 2018/0129801 A1 | 5/2018 | Cambou | |
| 2019/0207758 A1 | 7/2019 | Cambou | |
| 2020/0162271 A1* | 5/2020 | Cambou | .............. H04L 63/0435 |
| 2020/0169423 A1 | 5/2020 | Cambou et al. | |
| 2020/0213140 A1* | 7/2020 | Cambou | ............... H04L 9/3278 |
| 2020/0295954 A1* | 9/2020 | Cambou | ............... H04L 9/0866 |
| 2021/0243042 A1* | 8/2021 | Ahn | ....................... H04L 9/3278 |

OTHER PUBLICATIONS

S. Assiri et al., "Software Implementation of a Sram Puf-Based Password Manager," in Science and Information Conference, Springer, pp. 361-379, 2020.
A. R. Korenda et al., "A Proof Of Concept Sram-Based Physically Unclonable Function (Puf) Key Generation Mechanism For IOT Devices," in 2019 16th Annual IEEE International Conference on Sensing, Communication, and Networking (SECON), pp. 1-8, 2019.
A. R. Korenda, et al., "A Secret Key Generation Scheme for Internet of Things Using Ternary-States Reram-Based Physical Unclonable Functions," in 2018 14th International Wireless Communications Mobile Computing Conference (IWCMC), pp. 1261-1266, 2018.
J. Delvaux et al., "Efficient Fuzzy Extraction of PUF-Induced Secrets: Theory and Applications," in International Conference on Cryptographic Hardware and Embedded Systems. Springer, pp. 412-431, 2016.
M. Taniguchi et al., "A Stable Key Generation from Puf Responses With A Fuzzy Extractor For Cryptographic Authentications," in Consumer Electronics (GCCE), 2013 IEEE 2nd Global Conference on. IEEE, pp. 525-527, 2013.
D. Merli et al., "Protecting PUF Error Correction by Codeword Masking," IACR Cryptol. ePrint Arch. 2013 (2013).
P. Kocher et al., "Introduction To Differential Power Analysis," Journal of Cryptographic Engineering, vol. 1, pp. 5-27, 2011.
M. Yu et al., "Secure and Robust Error Correction for Physical Unclonable Functions," IEEE Design Test of Computers, vol. 27, No. 1, pp. 48-65, 2010.
K. Kursawe et al., "Reconfigurable Physical Unclonable Functions-Enabling Technology for Tamper-Resistant Storage," in Hardware-Oriented Security and Trust, 2009. HOST'09. IEEE International Workshop on. IEEE, pp. 22-29, 2009.
G. E. Suh et al., "Physical Unclonable Functions for Device Authentication and Secret Key Generation," in Proceedings of the 44th annual design automation conference. ACM, pp. 9-14, 2007.
D. Lim et al "Extracting Secret Keys from Integrated Circuits," IEEE Transactions on Very Large Scale Integration (VLSI) Systems, vol. 13, No. 10, pp. 1200-1205, 2005.
L. Chua, "Memristor—The Missing Circuit Element," IEEE Transactions on Circuit Theory, vol. 18, No. 5, pp. 507-519, 1971.
H. Kang et al., "Performance Analysis for PUF Data Using Fuzzy Extractor," In Ubiquitous Information Technologies and Applications. Springer, pp. 277-284, 2014.
B. Škoric et al., "Robust Key Extraction from Physical Uncloneable Functions," In International Conference on Applied Cryptography and Network Security. Springer, pp. 407-422, 2005.
J. Kim et al., "Predictive Analysis of 3d Reram-based PUF for Securing the Internet of Things," In 2018 IEEE Region Ten Symposium (Tensymp), IEEE, pp. 91-94, 2018.
B. Cambou, "Unequally Powered Cryptography With PUFs for Networks of IoTs," IEEE Spring Simulation Conference, 2019.
B. Cambou et al., "Response-Based Cryptographic Methods with Ternary Physical Unclonable Functions"; 2019 SAI FICC, IEEE, 2019.
B. Cambou et al., "Ternary Computing to Strengthen Cybersecurity, Development of Ternary State based Public Key Exchange", 2018 SAI Computing Conference, IEEE 2018.

* cited by examiner

INDIVIDUAL DIGITAL ACCESS WITH TERNARY STATES AND ONE-WAY UNCLONABLE FUNCTIONS TO PROTECT DIGITAL FILES

CROSS-REFERENCE TO RELATED APPLICATIONS

The present application claims priority to U.S. Provisional Application 63/281,577 entitled "Individual Digital Access with Ternary States and One-Way Unclonable Functions to Protect Digital Files," filed on Nov. 19, 2021, the contents of which is incorporated herein by reference in its entirety.

STATEMENT REGARDING FEDERALLY SPONSORED RESEARCH

This invention was supported by the United States Air Force Research Laboratory under Grant No. FA8750-19-2-0503 awarded by the Air Force Research Laboratory. The Government has certain rights therein.

BACKGROUND OF THE INVENTION

Information is frequently encrypted to protect against eavesdropping and unauthorized access using encryption schemes based on the use of one or more encryption keys and other keyless encryption schemes. Security systems based on physical unclonable functions are known. In particular, it is known to provide an array of addressable devices, each of which may be characterized as a physical unclonable function. Such arrays will be referred to herein as "PUFs". The use of PUFs has been described for providing for the generation and exchange of encryption keys, which may be used both to encrypt and decrypt secure files and messages, and for authentication of trusted machines. In these systems, a PUF acts as an "electronic fingerprint", which is unique to a user or device in possession or control of the PUF device. Generally, a PUF device is an addressable array of individual devices that may be queried with a "challenge" and that will return a response reflecting some physical characteristic of the device. The response, or at least, a set of responses from a given PUF array, are unique to that device, and are unpredictable by a party not in possession of that device, even if that party is in possession of a PUF challenge. Thus, by providing a challenge, which may be bitstream identifying a range of individual devices and conditions for measurement, the PUF device may return a consistent, repeatable, but unpredictable and unique response. The response may be used to generate encryption keys. Two devices, one in possession of the PUF device, and the other in possession of a database with previously measured sets of challenges and corresponding responses, may be used to generate the same response in response to the same stimulus or measurement conditions, and thus, may be used to generate matching seeds for encryption keys in parallel.

U.S. patent Ser. No. 11/496,326, entitled "Physical unclonable function-based encryption schemes with combination of hashing methods" generally describes systems and methods for the use of PUB and databases with previously measured responses (referred to herein as "images") to generate matching encryption keys for encrypting files and messages. The disclosure of that reference is incorporated herein by reference in its entirety for all purposes. While the methods set forth in that reference are helpful, they can be improved upon. For example, when machines are deployed in an untrusted environment, a client PUF may fall into hostile hands, or a hostile entity may otherwise gain the ability to supply challenges to the PUF and obtain responses. Additionally, "man in the middle" attacks may intercept inform ad on exchanged between machines that is used to generate PUF challenges. With access to a PUT, and with information in hand sufficient to generate PUF challenges that correspond to a key, an attacker may be able to generate a matching encryption key.

BRIEF SUMMARY

Embodiments of the invention are directed to computing systems using PUFs, as one example, to realize one-way functions capable of generating, for example, encryption keys. In the inventive embodiments, a challenge is supplied to a PUF, and the corresponding response is used to generate an encryption key. The challenge is a set of parameters usable to measure one or more physical characteristics of the PUF. The challenge, or information capable of generating the challenge, is divided between two or more exchanges of information (e.g., message digests), exchanged between machines, and neither message digest alone includes information from which the other message digest may be recovered. In some embodiments, the first message digest reveals a superset of PUF device addresses, and the second message digest reveals masking information useable to select among the superset to obtain responses from a subset of the superset. The responses of this selected subset of responses are then used to generate the key necessary to decrypt the file. Thus, to obtain the key, an attacker must be in possession of both message digests and either the PUF itself, or its image, as well as additional information such as a shared password. In this way, security in untrusted environments is greatly enhanced.

Inventive embodiments are directed to systems and methods for managing access to digital files. In one embodiment a server is provided that has a PUF image corresponding to a PUF in possession of a client device. The server will encrypt one or more digital files using responses from the PUF image. This may be accomplished by generating a random number, and then combining the random number using a reversible function (like XOR) with a password, which is shared with a client device. The resulting number may then be expanded or hashed to result in a first list of addresses of PUF device (i.e., a superset). The random number is sent to the client, which may use it with its own copy of the password to generate the same first list of addresses.

This superset of addresses is longer than what is necessary to generate a response bitstream of the correct length to use as an encryption key. Additionally, this first list of addresses may include erratic devices that should not be included for key generation. Accordingly, the server generates masking data (which may exclude erratic cells, and then may exclude an additional random number of good cells), which winnows the list of addresses to the appropriate length, i.e. 256 cells or cells sufficient to produce a 256 bit long number from the responses. The masking data is applied to select the responses of a second list of devices, the second list being shorter than the first. The responses from this second set of cells are then used as, or to generate, an encryption key to encrypt the file. The file is then sent to the client. The server may delete all versions of the file (plain text and encrypted), as well as the random number.

The server also conveys the masking information, in encrypted form, to the client, preferably in a second transmission as a second message digest. This is done by encrypting the masking information (e.g., with a reversible function like XOR) with some piece of information that the client can determine. In a preferred embodiment, the masking information is encrypted with the first list of addresses, or some number that can be generated with the random number (already sent to the client) and the shared password (already in possession of the client). The encrypted masking Thus, the client can uncover the masking information, and use that information to either only measure the PUF response of unmasked cells identified in the second list of addresses, or measure all cells identified in the first list, and then selectively pick the responses corresponding to the subset of addresses in the second list. Those responses are then used by the client to decrypt the message. Measuring all cells, then selecting the responses dictated by the mask may be preferable to only measuring the correct cells, in order to guard against certain power analysis attacks.

In addition to the pieces of information indicated above, the server may also send helper data to the client permitting the client to do error correction on its measured PUF responses. Additionally, the masking information may contain information on the measurement conditions under which the PUF should interrogate its cells.

Embodiments of the invention have certain advantages. In one implementing example, a server device may generate a key set using a PUF image as a one-way function. The key set may be used to encrypt a set of digital files (e.g., digital media such a music or movies, equipment instruction manuals, military orders or codes, session keys, etc.). Those encrypted files may be sent to a client device in possession of a PUF, which files may then be stored. Later, the server may send two or more pieces in independent information (e.g., as message digest), all of which are necessary to generate a matching key from the PUF, which may then be used to decrypt the file.

In one embodiment, the use of just one or some subset of the transmitted information in an attempt to generate a key with the client PUF is tamper evident. For example, the client PUF may be an array of ReRAM-based PUF devices, each of which requires application of a probe current to measure resistance as a response. For such a PUF, a first piece of transmitted information may be a bitstream reflecting or usable to generate a set of addresses of devices in the array to be measured, and a second piece of information may be a probe current to be used for the measurement for one, or for each ReRAM device individually. In the case of a ReRAM the use of a probe current outside of a specified range (e.g., a probe current that exceeds a ReRAM semi-permanent conductive path forming threshold), may cause permanent changes or damage to the device being measured, and these permanent changes or damage can be detected and provide evidence of an unauthorized, brute-force attempt to generate a key using the PUF. The client device may include a monitoring circuit that periodically sweeps its PUF to verify that resistances remain within a pre-defined normally operating range, so as to detect devices that have been probed with current ranges outside of a specified range. In the event that such devices are detected, the client device may determine that the PUF has been accessed without authorization, and it may take one of a number of steps such as: deleting all encrypted files in storage, sending an alert message to the server or to other client devices indicating that it has been compromised, refusing communication with all networked devices, or destroying the PUF by sweeping the entire array with high probe currents.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

Figure 1:
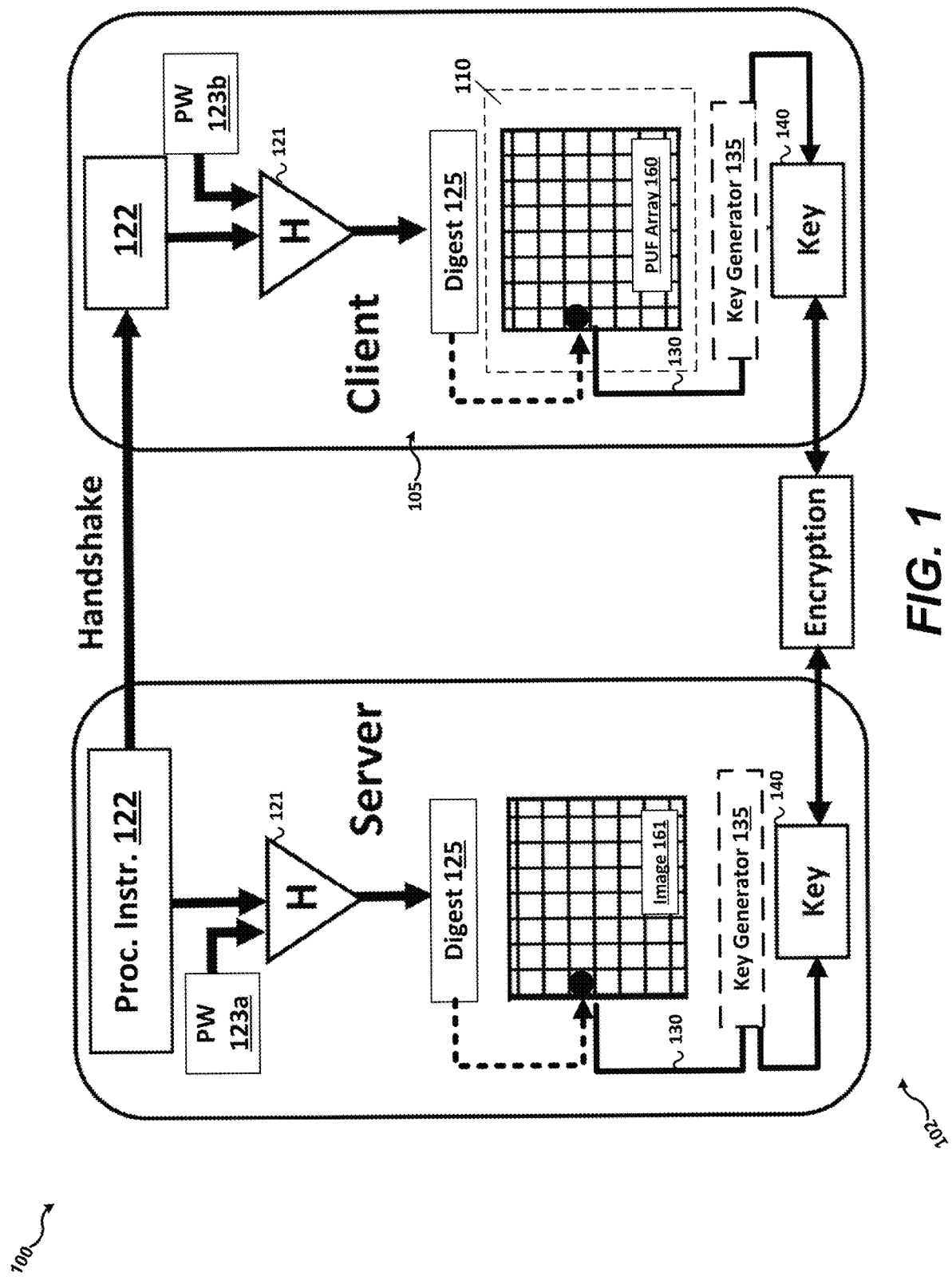
FIG. 1 depicts a computing environment usable in connection with inventive embodiments.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource. References to "one-way functions" refer mathematical operations which are easy or practical to compute but whose inputs are difficult or impractical to recover using a known output of the function given the computational resources available. References to "approximately" or "effectively" one-way functions refer to functions that may be easily inverted if additional "secret" information is known but which are one-way to a party that does not have access any such secret information.

Conventional systems and methods for secure digital file storage frequently rely upon encryption of files using encryption keys which may be symmetrical or asymmetrical (e.g., in public key encryption schemes). Such key-based encryption schemes have disadvantages. First keys must be generated and stored by various parties, introducing the possibility that the keys may be compromised by a malicious party. Additionally, key-based encryption schemes may be vulnerable to brute force attacks wherein a malicious party may discover the key given access to a message encrypted with that key.

Addressable PUF generators ("APGs") may be used to generate encryption keys. An APG includes a PUF array and associated circuitry (which may include a memory and a hardware processor), that, together, are capable of measuring a physical device characteristic of individual addressable PUF devices within the PUF array. APGs can be thought of as "wallets" of keys that are addressable though a handshake with a server. Rather than exchanging keys through insecure communication channels, both parties exchange (or independently access) information, which may include random numbers and instructions and generate the keys directly from their "wallets." Thus, large numbers of keys can be made available for use, without requiring large exchanges of information over communication channels which may weaken security and/or impose performance penalties.

In the context of this disclosure, a processing instruction is any information used to cause an APG to produce an expected response (sometimes referred to as a "challenge response" in the context of authentication systems) corresponding to that information by measuring one or more PUF devices. Processing instructions may be used to cause an APG to access devices (or ranges of devices) in an array of PUF devices belonging to the APG. Along these lines, a processing instruction may be supplied to an APG which is used to produce a response having one or more expected values which depend upon characteristics of the PUF array belonging to the APG to which the processing instruction is issued. The appropriate response may be derived from those characteristics using instructions stored by the APG or other processing circuitry, received by the APG or other processing circuitry and/or additional information supplied to the APG or other processing circuitry (such as a password of a user). In one simple non-limiting example, a processing instruction processing instruction might simply cause an APG to return the values stored by devices of a PUF array at a specified address or range of addresses. In other non-limiting examples, a processing instruction processing instruction might include instructions to perform a mathematical, logical, or other operation(s) on those values. In yet another example, a processing instruction may include both a range of devices to be measured, and measurement conditions under which the devices are to be measured (for example, probe current values, a temperature range, etc.)

Use of PUFs for the generation of encryption keys generally requires that the PUF be initially characterized during an enrollment process, which builds a clone of the PUF's response profile, which may be stored. During enrollment, the fingerprint (i.e., the responses of the PUF) is memorized by the server in the form of a lock up table, or cryptographic table. The cryptographic table, referred to herein as an "image" of the PUF, may be stored in a memory located on a server device. Assuming that the PUF is reliable, the server in possession of the image can retrieve the same PUF response generated by measuring the PUF on the client side. Oftentimes, the client, which is contemporaneously measuring the PUF, may generate slightly different results than those that were initially measured to build the image. Thus, it is advantageous to provide error matching and correcting methods to address the potential mismatches when the PUF is subject to aging, temperature changes, or environmental variations.

A processing instruction (which may be thought of as a PUF challenge, or an element of a PUF challenge) generated by the server may become a "public key" that is openly shared between communicating parties. The processing instruction may be hashed with an additional password, PIN code, and/or biometric data (e.g., fingerprint, vein pattern, or retinal data). In some embodiments, both a server and a client device (or other such devices) that share access to data representing characteristics of a PUF itself can independently generate encryption key pairs according to any suitable asymmetric encryption scheme. While such asymmetric key pairs frequently referred to as "public" and "private" keys, it should be noted that the embodiments herein enable the use of such key pairs without the need for a so-called "public" key to be published or made publicly available in any way, while still realizing the other known benefits of public/private key encryption.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., '0' or '1') after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the '0' or '1' state could be used as a characteristic of that device. Other non-limiting examples of suitable characteristics include optical measurements. For instance, a PUF device may be an optical PUF device which, when illuminated by a light source such as a laser, produces a unique image. This image may be digitized and the pixels may be used as an addressable PUF array. A good PUF should be predictable, and subsequent responses to the same processing instruction should be similar to each other (and preferably identical).

Additional non-limiting examples of measurable physical characteristics of devices used in PUF arrays are currents induced by an applied input voltage or current, voltages of various circuit elements during operation of a PUF device in response to an input or other stimulus. Further non-limiting examples may include derived quantities such as resistance, conductance, capacitance, inductance, and so on. In certain embodiments, such characteristics of a device may be functions of an input or stimulus level of the device. For example, a current-voltage characteristics of memristors and other devices may be non-linear. Thus, the measured resistance of a memristor will depend on a current or voltage level applied during the measurement process. If a memristor or device with similar characteristics is operated within a non-hysteretic regime, the measured resistance may be a predictable function of the input stimulus (e.g., an input current supplied by a current source). Thus, the relationship between applied current and voltage measured across a memristor (or between applied voltage and current measured through the memristor) is one example of a non-linear transfer function which can be exploited to produce multiple discrete or continuous characteristic values using a single PUF device.

An additional non-limiting example of a measurable physical characteristic of a device usable in PUF arrays includes the cell resistance of a pre-formed or pristine ReRAMs when subject to low level probe current. Such devices are described in U.S. patent application Ser. No. 17/395,360, entitled "SENSING SCHEME FOR LOW POWER RERAM-BASED PHYSICAL UNCLONABLE FUNCTIONS", the disclosure of which is incorporated herein in its entirety for all purposes. Such devices are particularly advantageous because they are tamper-evident. If a brute force attacker attempts to elicit a PUF response with a probe current outside of a predetermined range (e.g., a probe current sufficient to begin the ReRAM forming process), the resistance of one or more of the cells will be permanently altered. Indeed, it will generally be decreased by several orders of magnitude, thus alerting a client device that is monitoring the resistances of the cells that an attack has occurred or is underway.

FIG. 1 illustrates key generation in a computing environment usable for implementation of the methods and protocols described below in reference to FIG. 2-4. The key generation process used to illustrate the environment of and terminology used with respect to the arrangement of FIG. 1 is provided as background for the embodiments later described.

In the example embodiment 100 of FIG. 1, there are two computing devices: a server 102 and a client 105. As will be further described below, the methods herein are not limited to practice on only two machines, and they may be practiced on more than two machines. Moreover, while "client" and "server" devices are illustrated in FIG. 1, it should be understood that multiple machines implementing the inventive protocols described herein may perform other or different functions than those typically performed in a client-server relationship. For example, keys and encrypted files may be shared among multiple "client" devices in a peer-to-peer fashion using the protocols described herein.

Client 105 and server 102 may be computing devices. In particular, both devices may have programmable microprocessors such as CPUs, RAM or other volatile memory, non-volatile memory, special purpose processors such as GPUs, user interface devices such as displays, hard or touch-sensitive keyboards, microphones, cameras and speakers, and wired or wireless network or other communication interface devices. Client 105 and server 102 may also execute processes on their respective processors to generate true or pseudo-random numbers, which processes may be referred to herein as a "random number generators" or RNGs. Client 105 and server 102 are not limited to any particular form factor. They may be desk top computers, file or application servers, mobile phones, tablets or other devices. In certain embodiments, the methods, processes and protocols set forth below are executed by a device's programmable processor in response to computer readable instructions encoded in a non-volatile computer readable medium such as a memory. In certain embodiments, the storage medium may be local to a computing device, or it may be physically remote, for example, in a cloud storage device in networked communication with a computing device. Additionally, in some cases, processing may be performed by multiple processors, which may be located on a device, or may be located on another device in networked communication with the device, as in the case of a cloud application server.

Returning to the simplified example embodiment 100 of FIG. 1, a client device 105 has an APG 110 including a PUF array 160. The client 105 communicates with a server 102 according to an encryption scheme in which the server 102 and client 105 communicate securely by encrypting communications between them with an encryption key 140 that is independently generated by the client 105 and the server 102 using a processing instruction 122 issued by the server 102 to the client. The APG includes a PUF array 160 which may be accessed by a microcontroller or microprocessor of the client 105 or other processing circuitry of the client. The PUF array 160 of a client 105 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 160) may be unique, even if the PUF arrays are mass-produced by a process designed to produce nominally identical devices. The PUF array 160 (shown as a 2D-array of cells) of a client 105 may be accessed by the client 105 which receives processing instructions 122 (originating in this example from the server 102). The APG of the client 105 responds to processing instructions 122 by generating responses 130 using measured characteristics of one or more PUF devices within the PUF array 160 identified by the processing instruction 122 or derived from it using instructions stored by the client 105. As shown, the processing instruction 122 (which may be a random number, seed value, or any other suitable string, bitstream or other information) may be used to generate a digest 125 using a hash function 121. The digest 125 may be used to specify an address or range of addresses in the PUF array 160 (or the image 161 of the PUF array 160). Additional security may be provided by combining the processing instruction 122 with an optional password such as the password 123a for the client 102 and the password 123b for the client 105. The passwords 123a,b may be the same or different.

Client 105's APG contains a PUF array 160 that is unique to the client 105. The APG includes the PUF array itself and associated circuitry (e.g., current sources, read/write circuitry, registers, etc.) necessary for measuring the relevant physical characteristics of the PUF array 160, and applying measurement stimulus if necessary. Thus, the APG of the client 105 may be used to generate numerous responses 130 unique to that client 105. These responses 130 cannot be replicated by an attacker without physical access to the PUF array 160. The responses 130 may be used as the encryption key 140 or may be otherwise used to derive the encryption key 140. The server 102 may similarly use the image 161 of the PUF array 160 and the processing instruction 122 to independently generate the key 140 or derive it. As is discussed above, the image 161 reflects a comprehensive characterization of the response of the PUF array 160, which is built by measuring all devices in the PUF under the range of expected measurement conditions/stimulus. This enrollment process is performed, preferably, in a secure environment before the client 105 is deployed in an untrusted environment. The image 161 is stored in storage on server 102 or on networked storage in network communication with server 102.

After clients 105 are enrolled with the server 102, embodiments disclosed herein may be utilized to authenticate the client 105 and produce the encryption key 140 which the server 102 and client 105 may use to communicate securely. First, the server 102 and the client 105 enter the Handshaking stage. In the Handshaking stage an objective is for the server 102 to transmit the information needed to identify a particular portion of the PUF array 160 of the client 105. Both the server 102 and the client 105 can independently produce a response to the processing instruction 122: the server can lookup information about the PUF array 160 obtained during enrollment (or otherwise supplied to the server 102) and the client 105 can retrieve the same information by using its APG to access and measure the PUF array 160.

During Handshaking, the server 102 issues a processing instruction 122 to the APG 110 of the client 105. This processing instruction 122 is used by the APG 110 to identify the portion of the devices belonging to the PUF array 160 to access, and optionally, measurement stimulus or other measurement conditions (e.g., probe current values in the case of a ReRAM PUF). This processing instruction 122 may be, may include, or may derive from a random number. In some embodiments, the server 102 and the client 105 may have access to the same random number generator or may have synchronized random number generators. In such embodiments, the server 102 does not need to transmit the processing instruction 122 to the client 105 in order for the client 105 to generate the processing instruction 130 using the APG 110.

In some embodiments the ability of the client 105 to generate the response 130 may be protected by a password such as the password 123b. In such embodiments, the address specifying which device(s) in the PUF array 160 to access may be produced by combining the processing instruction 122 with the password. As a non-limiting example, the client 105 may input the password and the processing instruction into a hash function to produce the address in the PUF array 160. As an example, if the PUF array 160 is represented as a two-dimensional array containing 256 rows and 256 columns, 8 bits of the message digest can be used to find a first coordinate X in the PUF array 160; the following 8 bits can be used to find a second coordinate Y.

The measurement of characteristics of individual PUF devices may not be perfectly deterministic. As part of the Handshaking process, the server 102 may send additional information to the client 105 for use in making generation of the processing instruction 130 more reliable. Such information may include a checksum or other error-correcting information for use with error-correcting codes, or other information or instructions used in response generation schemes to be discussed later below. Upon receiving the processing instruction 130, the client's APG may use the additional to generate corrected response or exclude unreliable devices belonging to the PUF array 160 from the response generation process. The server may determine that certain devices of the PUF array 160 are unreliable. The location of erratic or unreliable cells may be uncovered during the enrollment process, during which the cells may be measured multiple times. These cell positions may be identified within the image 161. Thus, the server can use the image 161 of the PUF array 160 and may transmit information identifying unreliable devices to the client 105, or exclude them from the processing instructions sent. The client 105 may, in certain cases, independently determine that certain devices are unreliable such that both the server 102 and the client 105 agree on devices which should be excluded. This would require on-the-fly repeated measurements of PUF devices by the client, which may not be desirable in all cases. Other error-correction or minimization methods may also be employed.

To expand on the process just described regarding masking erratic cells, during enrollment, the server may issue each possible processing instruction repeatedly and track the statistical distribution of values measured for each PUF device. The server may then determine that certain PUF devices are "unreliable" and should not be used to generate responses and store information to that effect. During Handshaking, the server may then transmit that information to the client, or the client may already store similar or identical information. Additional methods for error reduction may be used to augment or replace the approach above. One such additional method also entails repeatedly measuring each PUF device and assigning values to the measured characteristic(s) of that PUF device based on the ranges of the measurement values. For instance, one value may be assigned to measurements that fall within a first range and another value assigned to values in a second range exclusive of the first range, and so on. As long as the measured values for a device remain within one range, that device may be used to produce a reliable value during response generation. As before, devices which are "unreliable" (i.e., their measured values do not remain within a single range, or deviate from that range with unacceptable frequency) may be excluded from use in response generation and other procedures requiring reliable values.

Even in cases where erratic PUF devices have been masked from the response, remaining cells may return slightly different values when they are queried by the client's APG 110 as compared to when they first measured during enrollment. The response of a particular device may change over time, for example, or with temperature. Even slight variations in the PUF response may result in non-matching encryption keys being generated at client and server. To address this problem, the server may send helper instructions in the form of error correction codes that may be used to correct measured PUF responses. Methods for accomplishing are disclosed in U.S. patent application Ser. No. 17/542,118 entitled "ERROR CORRECTING SCHEMES FOR KEYLESS ENCRYPTION", the entirety of the disclosure of which is incorporated herein by reference in its entirety.

The arrangement of FIG. 1 and related embodiments are compatible with numerous encryption schemes use cases. In the simplest such scheme, the response 130 are used directly as a shared encryption key (i.e., for symmetric encryption). The client 105 and server 102 use information describing the PUF array 160 to independently arrive at the same key 140 (or multiple keys 140). In embodiment 100, both the client 105 and server 102 are depicted optionally using a key generator 135 to produce keys 140 from the responses 130. The key generator 135 may employ any suitable algorithm to generate keys including (but not limited to) using cryptographic hash functions and/or other one-way functions, or approximately-one-way functions such as functions which are effectively one-way unless a party has access to secret information (i.e., so-called "trapdoor functions"). As one non-limiting example, the key generator 135 may implement an algorithm which generates a public key from a private key input according to a particular asymmetric encryption scheme, non-limiting examples of which include elliptic curve encryption, Diffie-Hellman, El-Gammal, D S A, et al. In such instances, the responses 130 may be used as a private key input to an acceptable key generation algorithm or a private key may be derived from the response 130 using any suitable method. Along these lines, the client 105 and server 102 may exchange encrypted information using any suitable encryption scheme once the key 140 (or keys 140) has been determined. The two parties may use symmetric encryption, asymmetric encryption, or hybrid methods including key encapsulation techniques as non-limiting examples. Notably, in certain embodiments, the client or server may encrypt a message or otherwise use a "public key" without any requirement that this public key be known to any party other than the server 102 and/or client 105. It will be understood that the term "public key" in this context is used to mean a key that conforms to an asymmetric encryption scheme specifying "public" and "private" keys. Thus, in the context of this disclosure, the term "complementary key" may be used to describe what is frequently called a public key in asymmetric cryptography schemes.

Specific non-limiting examples of cryptographic schemes which may be augmented with systems and method disclosed herein include: RSA, Kyber, Crystals-Kyber, FrodoKEM, LAC, NewHope, NTRU, NTRU Prime, Round2, HILA5, Round5, SABER, Three Bears, McEliece, NTS-KEM, BIKE, HQC, LEDAkem, LEDApkc, LEDAcrypt, LAKE, LOCKER, Ouroboros, Ouroborus-R, Rollo, RQC, SIKE, Dilithium, Falcon, qTesla, GeMSS, LUOV, MQDSS, Rainbow, Picnic, WOTS, WOTS$^+$, FORS, SPHINCS$^+$, and others. It will be appreciated that the examples above represent disparate classes of encryptions schemes including lattice-based schemes, code-based schemes, hash-bashed schemes, and so on. It will be further appreciated that embodiments disclosed herein are applicable for use with these and many other schemes.

While the example arrangement of FIG. 1 is directed to key generation for the purposes of encrypted communication between server and client, other use cases are possible. For example, the server may generate a key, encrypt a digital file, and send the digital file to the client for storage. At a future point in time, the server may then have need to decrypt the file, and so would generate a matching key for use for decryption. For the sake of security, it may be advantageous for the client, which in this case may be in an unsecure environment, to lack the ability to decrypt the encrypted files until some point in the future. While this may be accomplished, in the embodiment of FIG. 1, by delaying the sending of processing instructions until some future point in time, that handshake communication may be intercepted by a hostile man-in-the-middle entity. In the embodiments that follow, described in reference to FIGS. 2-3, multiple pieces of information are required by the client to generate the PUF challenges that result in the encryption key, and so, security is greatly enhanced.

The inventive embodiments described below use one-way unclonable functions, which may be realized by PUFs. As used herein, one-way unclonable functions $\Psi$ are functions that generate a stream of bits K from a plurality (ideally two or more) input parameters. Exemplary input parameters may include a random number T and a second piece of information that will be referred to herein as "individual digital access instructions (IDAccess)". One way to express a one-way unclonable function is shown in Equation (1):

$$K \leftarrow \Psi(T, \text{IDAccess}) \qquad \text{Equation (1)}$$

A one-way unclonable function has the following properties:
1) One-way
   i. The knowledge of K does not disclose the value of the input parameters T and IDAccess;
   ii. The knowledge of one input parameter alone, T or IDAccess, does not disclose K.
Additionally, preferably, the knowledge of one input parameter (e.g., T) provide no information regarding the other input parameter (IDAccess).

In preferred embodiments, the function $\Psi$ is provided by an addressable PUF array. That is to say, the input parameters T and IDAccess, together, will include information about PUF addresses, and in some circumstances, measurement conditions, and other information such as masked addresses, the PUF is measured in accordance with that information, and the resulting PUF response bitstream is K.
2) The Leveraging of Ternary States.

The use of PUFs as one-way unclonable functions has several advantages, among them is the ability to leverage ternary states for increased security. As is set forth above, some PUF devices in an array will have an erratic response. During an enrollment process such as the ones described above, the locations of these cells can be identified and assigned a ternary "X" state, where other devices may reliably produce a binary state. The information specifying the locations of the erratic, ternary device locations (i.e., a mask), can be incorporated into the information used by the client to measure the PUF response so that the erratic device locations are excluded. For example, IDAccess can incorporate a ternary representation that reduces the bit error rates (BER) of the output stream K. Alternatively, the mask can be sent as a separate piece of information. This property can offer additional protections. When an opponent tests the one-way function without knowing the position of the ternary states, $\Psi$ generates streams with high BER that cannot be used to create an encryption key that matches a server-side key. Additionally, measuring the erratic devices (which the attacker cannot identify) can, for some PUFs, potentially damage the structure permanently, which can be detected.
3) Collision Avoidance.
   i. Any change in the input parameters should be highly likely to generate a different output;
   ii. Two different outputs should be likely the result of different inputs unless the difference in the output is small enough.
4) Unclonability
   i. The function is unclonable and can have a physical implementation making it highly unlikely to be duplicated;
   ii. During enrollment, the image of the one-way function of the client device can be stored in a look-up table of the controlling device (e.g., a server). This allows the controlling device to communicate safely with the client device as both parties can independently generate the same stream K from the shared input parameters T and IDAccess, and then they can use K as part of a cryptographic protocol.

As eluded to above, one-way unclonable functions having the properties just discussed can be PUFs. The responses generated by the PUFs in response to challenges during key generation cycles can be used to generate keys that match keys generated with responses previously generated during enrollment. With error correction and ternary masking of erratic cells, protocols based on PUFs can be effective, even with aging, drifts, and environmental effects acting on the physical PUF. In particular, the use of error correction codes and other helper data can be used to reduce the BERs between responses and the ones collected during enrollment, making PUF responses usable to generate cryptographic keys. In certain applications, the data helpers should be protected by encryption schemes to avoid leakages to the opponents.

Protection of Terminal Devices and their Digital Files with PUFs

While the methods described above generally contemplate encrypted communication between devices, one-way unclonable functions may also be used to provide for secure storage of encrypted digital files in unsafe or untrusted environments. In particular, physical elements such as PUFs, tags, and other hardware systems may be to secure both the terminal devices and their digital files because they can be tamper-resistant.

The protocols about to be described may be used to secure any sensitive information on a computing device in a hostile environment. These systems be used to permit the recovery of a root key or session key from the measurement of a circuit function (i.e., a PUF response). Also, a checkpointing feature can be used to periodically probe the PUF and mark measurements of this function and thereby track drift in the value of the root key over the life of a digital device. An information distribution device can be configured to distribute an encrypted update program to a control device connected through a wide-area communication network. This includes:

i. a PUF information acquiring unit configured to acquire PUF information of the control device recorded in advance;
  ii. an additional information acquiring unit configured to specify and acquire any of a plurality of pieces of additional information recorded in advance;
  iii. an encryption processing unit configured to encrypt protection target information, based on the PUF information, and the additional information that are acquired; and
  iv. a transmission processing unit configured to transmit the encrypted update program to the control device, wherein the additional information acquiring unit is configured to change the additional information to be specified in accordance with a time.

Systems and methods are also provided herein which improve a computer system's resistance to tampering. A PUF is one component of a system. According to one aspect, tamper protection provided by the PUF may be extended to one or more other components of the system, thus creating a network of tamper-resistant components. The system may include a tamper detection circuit that receives signals from the component(s). The tamper detection circuit generates an output signal based on the received signals that indicate whether any of the components has been tampered with. The PUF may be configured to use the output signal to generate secret information. If the output signal indicates that one of the components has been tampered with, the PUF may prevent generation of the correct secret information.

A system for recording a digitally signed assertion using an authorization token is also possible in view of the disclosures below. This includes a cryptographic evaluator designed and configured to receive a dataset and an authorization token, which includes a verification datum of a device-specific secret possessed by the cryptographic evaluator, a digital signature of a certificate authority generating the authorization token, and a secure temporal attribute. The cryptographic evaluator is configured to produce a secure proof using the device-specific secret. The cryptographic evaluator is configured to generate a first digitally signed assertion as a function of the dataset, the secure proof, and the authorization token. The cryptographic evaluator is configured to enter the first digitally signed assertion in at least an instance of a first temporally sequential listing.

Use of Ternary States to Protect PUF-Based Cryptographic Systems

The schemes presented in this disclosure can leverage the addition of a ternary state to track the addresses in the PUF that should be avoided because the physical element is fuzzy, marginal, unstable, or fragile. The objective is then to reduce BERs and improve reliability. A thorough enrollment cycle identifies the "weak" addresses and the masking of all these known addresses to result in better quality PUF that requires little to no error correcting scheme for cryptographic key generation.

The masking of the addresses with fragile physical elements that can be damaged during normal operation has tamper resistance properties. A cryptographic protocol generating keys from the addresses of the PUFs, that are not masked with the ternary state, does not damage the weak physical elements. However, an opponent unaware of the position of weak elements, while trying to interact with the PUF, will damage them, leaving behind traces of the attack. A protocol to sense attacks could include reading at very low electric current these addresses and to detect some abnormal BERs.

Ternary based logic, as opposed to the mainstream binary logic, offers additional levels of security in cryptographic systems. The number of possible cases is higher, which add obfuscation and entropy. The addition of the additional state has been successfully integrated in PUF-based key generation schemes. The handshake between a server initiating a new key generation cycle, and a client device equipped with a PUF cannot be successfully initiated by man-in-the-middle attack unaware of the positions of the tri-states. Such a ternary representation can be combined with a scheme in which the keys generated from the addressable PUFs are different when the electric currents injected in the physical elements change. In addition of enhancing entropy, such a feature can strengthen the tamper resistance of the scheme. Here the fragile cells are only addressed at very low current, below the levels damaging them, while the normal key generation cycles operate at much higher current.

Key Generation from One-Way Unclonable Functions

In the inventive embodiments disclosed herein, information provided to a client device sufficient for key generation is divided or segregated into two parts, which may be provided separately. In the example protocols that will be described below, the random number T and the IDAccess parameter provide the necessary information to the client device to generate the key K from its one-way unclonable function. IDAccess may be computed on the basis of a mask M, which allows the masking of the ternary positions as defined previously. IDAccess can also optionally specify PUF device measurement conditions, such as injection current in the event that the PUF is a ReRAM or a Memristor. Taking that case as an example:

$$\text{IDAccess} \leftarrow (M, I) \qquad \text{Equation (2)}$$

It is advantageous to prevent the opponent from knowing M, the positions that should be masked, and if used, the current I injected during key generation. An example of protocol protecting both M and I has been successfully implemented with multi-factor authentication; the protocol, by which IDAccess may be calculated, is summarized below.

Protocol at the Server Level:
  i. Both communicating parties share a password PW.
  ii. Random number T and PW are concatenated, for example with a XOR:

$$T' \leftarrow T \oplus PW \qquad \text{Equation (3)}$$

iii. Stream T' is hashed with Extended Output function H to generate n-bit long message digest A. One example of such a function is SHAKE with SHA-3 (although others are usable such as MDA, SHA-1, and SHA-2):

$$A \leftarrow H(T') \qquad \text{Equation (4)}$$

iv. A is further extended to generate m addresses of the PUF to be considered for key generation at current I. The current I is described by a i-long stream, with (i+m)=n.
v. The m-bit long mask M is generated to select the addresses needed to generate the k-bit long key K with k<m.

$$K \leftarrow (A,M,I) \quad \text{Equation (5)}$$

vi. The m-bit long stream representing M and the i-long stream representing the current I are combined to generate a n-long stream M':

$$M' \leftarrow (M,I) \quad \text{Equation (6)}$$

vii. The n-bit long streams A and M' are XORed to generate IDAccess:

$$\text{IDAccess} \leftarrow M' \oplus A \quad \text{Equation (7)}$$

viii. Both T and IDAccess are communicated to the client device.

As is set forth above, the calculation of IDAccess, which will be used to generate the PUF responses, begins with the server (or the controlling device) and the client in possession of the same password PW. A series of passwords may be preloaded or pre-generated and stored on each device while the client is in a secure environment (e.g., during the enrollment process). Alternatively, users of both devices may enter the same password. Alternatively, each device may generate the same password using time synchronized RNGs. For example, each device may receive the same random number from its synchronized RNG and may expand or further randomize that number resulting in a password. Processes that may be applied may include hashing the random number with another number, applying the random number to an extended output function, chunking the number into segments and sequentially XORing the segments, etc. In a preferred embodiment, a user of the client device may provide the password to the server or controlling device at the time of enrollment and may then retain the password (external to the client device) until use. Alternatively, a series of passwords may be generated by the server device, preferably at enrollment, and these may be given to the user of the client device for future use.

Additionally, at the server, a random number T is generated with an RNG. This number may again be subjected to a one-way cryptographic function like a hash, may be XORed with another number, may be chunked and sequentially XORer, or may be otherwise modified in a predetermined manner. In cases where the client also has a synchronized random number generator, it may generate T in parallel, but this is not preferred. In a preferred embodiment, the client receives T from the server.

Still at the server, T and PW are combined. Preferably, this is done by XORing to result in T', but other combination operations are possible.

The goal here is to generate from T' (or more generally from a first piece of information containing a random number) a bitstream of sufficient length to identify a sufficient number of addresses of usable PUF devices. The number of addresses identified should be sufficiently high so as to result in a bitstream of measured responses of sufficient length to provide the correct-length encryption key for whatever encryption algorithm is being used. If, for example, the encryption algorithm accepts a 256 bit key, enough PUF addresses should be identified such that that, when measured, a response bit stream of 256 bits is generated (although shorter response bitstream lengths may be usable by expansion with an extended output function, for example). However, according to inventive embodiments, T' will be expanded such that it is capable of identifying a superset of addresses, which will include addresses beyond those necessary for key generation. This has at least two advantages. First, some of the addresses identified will be erratic or ternary cells, and these responses must be masked out of the responses used for key generation, to minimize errors. Second, randomly selecting a subset of addresses within the initially identified superset of addresses by a masking process applied to the responses generates another piece of information that would be needed by an attacker to correctly generate a matching key. This second piece of information (the mask) provides an additional level of security.

Accordingly, T' is expanded to a predetermined bit length, n resulting in A. This may be accomplished by hashing T' with an expanded output function such as SHA-3 or SHAKE. The bit length of T' is chosen to be long enough (bit length n) to identify a first predetermined number of addresses in the PUF/Image. This first predetermined number of addresses is higher than the number needed to generate the number of responses needed to provide an input bitstream to a selected key generation algorithm (i.e., this is the superset of addresses identified above). If the PUF being used requires specification of measurement conditions, such as currents at which each PUF device it to be measured, the current value for each device may also be optionally specified in A, which may require further expansion. Thus, A may reflect a set of device addresses, and if required, a set of currents for each specified device, where the number of addresses exceeds the number needed to provide the correct length response bitstream for the key generation algorithm.

In alternative embodiments, A is limited to device addresses, even in cases where the PUF for which the server holds an image requires device measurement condition information (i.e., currents for a ReRAM). In these circumstances, the server may generate I, the measurement condition information, by a separate process. That information may then be included in M' and sent to the client, as described below. In these embodiments, an attacker who gains knowledge of A (the address list), will not know the specified measurement conditions unless the attacker learns I. And in fact, if the attacker interrogates the client devices specified by A without knowledge of the correct measurement conditions, some devices may be damaged, with will reveal the attack.

The server will then interrogate its PUF image and retrieve the responses of the previously measured at the devices and under the conditions specified in A. This will result in a superset of responses, longer than the number required by an encryption algorithm selected. In order to reduce the response bitstream to the required length, a mask is generated and applied.

Accordingly, based on the addresses specified in A, the server may determine a mask M usable to identify (by inclusion or exclusion) PUF device addresses within those specified in A (i.e., a subset), the responses for which will be used for key generation. In a preferred embodiment, M excludes the responses from ternary, erratic devices, which are known to the server and identified in the server's image. Additionally, M excludes the responses from other randomly selected addresses within A, to reduce the number of responses to a number that will produce a response bitstream of the appropriate length. The randomly selected responses from addresses that are excluded may be selected as a function of a random number generated by the server's RNG. The result of this process is an m-bit long mask M which selects the addresses needed to generate the k-bit long key K with k<m. K, then, may be thought of as a "public key". K, then, is derived from retrieving stored responses from the PUF image at the initial superset of addresses A, at the corresponding measurement currents I (if applicable), then applying mask M. See Equation (5), above. While the measurement current data I may be included in A, this is not a requirement.

After using K to encrypt digital files to be transmitted to the client, the server preferably deletes K. The client is later sent fragmented information which, when used together, permits independent generation of K from the client PUF. To this end, the original superset list of addresses A is XORed with the mask (M or M') generate IDAccess, which is communicated to the client. In cases where additional measurement information is required (such as current I), this information may be incorporated into a new mask string M'. That is to say, in some cases the m-bit long stream representing M and the i-long stream representing the current I are combined to generate a n-long stream M'. The combination may occur by simple concatenation, but other methods may be used.

Random number T is also communicated to the client. IDAccess and T may be communicated in the same or during different communication systems. Either or both of these numbers may be encrypted by the server with an encryption key held by the client, which may then decrypt the numbers on receipt.

It will be noticed that if an attacker intercepts IDAccess, the attacker would need to independently generate the initial address list A in order to recover the masking information. If an attacker intercepts T, the attacker would still need access to the client password in order to generate T', which would be required to generate A, the initial address list. The attacker would also need to know the hashing algorithm used by the client to generate A from T'. Without the masking information, A is not useful to an attacker, even if the attacker is in possession of the PUF, because the unmasked A list of addresses contains too many addresses, including the addresses of erratic cells that will result in errors if used for key generation.

More generally, the protocol described above requires that at least two pieces of information be transmitted to the client: a first piece of information that is usable by the client to identify PUF devices have a first predetermined number of addresses (e.g., A), and then a second piece of information from which the client can recover masking instructions usable to select among the A responses to isolate those responses to be included in the key K. This second piece of information may also include measurement condition information (e.g., currents) if applicable. It will be appreciated that this "addresses plus mask" division is not the only way in which the essential information may divided. For example, information encoding a superset of addresses may itself be further divided into more than one message digests, which may then be transmitted separately. Masking information may also be further divided. In cases where measurement conditions (e.g., current levels for measurement) are used, this information can be provided in its own transmission, rather than being folded into M', as above. Moreover, while the protocols discussed here involve a client-server architecture, essential information might be further fragmented and distributed among multiple clients in a peer-to-peer relationship.

Protocol at the Client Level:

The client will receive one or more files encrypted with K, and will store them for future access. In order to decrypt the file, the client must generate its own copy of K. As is set forth above, in order to do that, the client receives from the server at least two pieces of information: a first piece of information usable to identify a first set of PUF devices in the client's PUF to measure, and a second piece of information usable to select among those measured responses to generate the key K (i.e., masking data). In the example being discussed, these two pieces of information are T (from which the address set A and optional currents can be generated with the use of the client password PW), and IDAccess, from which the masking information M' can be derived from A. With this information, the client device can find the current I, and the k positions in the PUF to be measured for the generation of the key K from the PUF. This defines the function $\Psi$ as written in Equation (1):

$$K \to \Psi(T, \text{IDAccess}) \qquad \text{Equation (1)}$$

Both communicating parties can generate independently the same key K as long as the server has an accurate image of the PUF and that both T and IDAccess are shared between them.

Downloading of Encrypted Files by the Server

Figure 2:
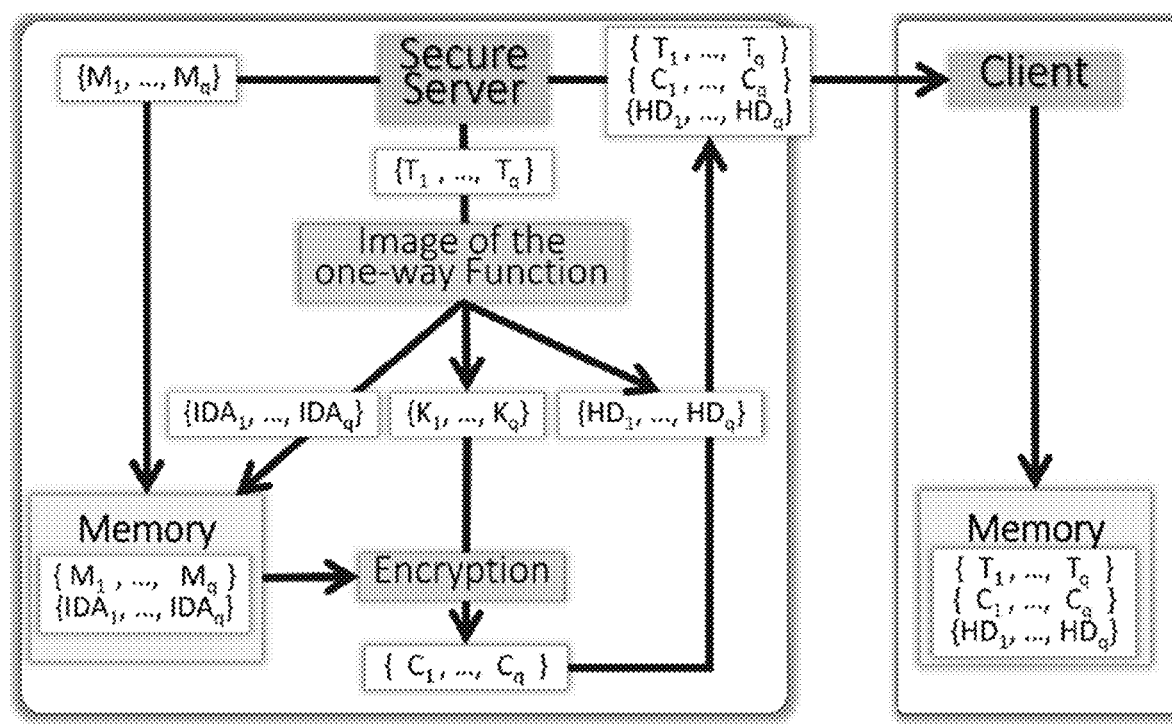
FIG. 2 depicts the downloading of encrypted messages to a client device equipped with a one-way unclonable function wherein the client cannot decrypt these messages.

FIG. 2 illustrates an exemplary process for transferring encrypted files from a server to a client for storage. The processes illustrated in FIGS. 2-4 may performed in the computing arrangement depicted in FIG. 1, where a server device that includes a processor and a memory including a PUF image, and a client device including its own processor, memory, and a PUF APG are provided as shown. According to the process of FIG. 2, to download a set of q messages $\{M_1, \ldots, M_q\}$ to a client device equipped with its one-way unclonable function, the server goes through the following steps:

i. Generation of a set of q random numbers $\{T1, \ldots, Tq\}$;
  ii. Using these q random numbers, and the image of the one-way unclonable function, generation of a set of q keys $\{K1, \ldots, Kq\}$ and associated individual digital access information $\{\text{IDAccess1}, \ldots, \text{IDAccess}\}$ which contain masking information reflecting the position of the ternary states that should be masked, and optionally the currents needed for key generation;
  iii. In anticipation of possible errors generated by drift of the client's PUF, the server can generate a set of q data helpers $\{DH1, \ldots, DHq\}$;
  iv. The q messages $\{M1, \ldots, Mq\}$ are encrypted with the set of q keys $\{K1, \ldots, Kq\}$ to generate a set of q cipher texts $\{C1, \ldots, Cq\}$
  v. The server transmits to the client device through unsecure channel the q random numbers Ti, the q cipher texts Ci, and the q data helpers DHi.
  vi. The client device stores the information for future reference.

At this point of the protocol, the client device cannot read the messages that were received from the server, because it does not have the IDAccess information for any of the files. It is assumed that third party can observe the transaction for future attacks, and so may have access to the set of random numbers and the encrypted files. The server, preferably, deletes the keys (K1 . . . Kq), and may also delete the encrypted files and the random numbers (T1 . . . Tq). The server need only retain the IDAccess numbers, and some abstract describing which IDAccess number corresponds to which encrypted files.

Downloading of Encrypted Files by the Client Device

In the example of FIG. 2, the files (i.e., "Messages") originate with the server and are encrypted by the server using the PUF image, but this is not a requirement. In alternative embodiments, the files may originate elsewhere, and may be encrypted by the client directly using measured PUF responses as a key. In these embodiments, the server may be serve as a custodian of information necessary for the client to decrypt the files that the client itself has encrypted, and indeed, without the server information, the client will be unable to decrypt its own decrypted files. Such an embodiment is shown in FIG. 3.

Figure 3:
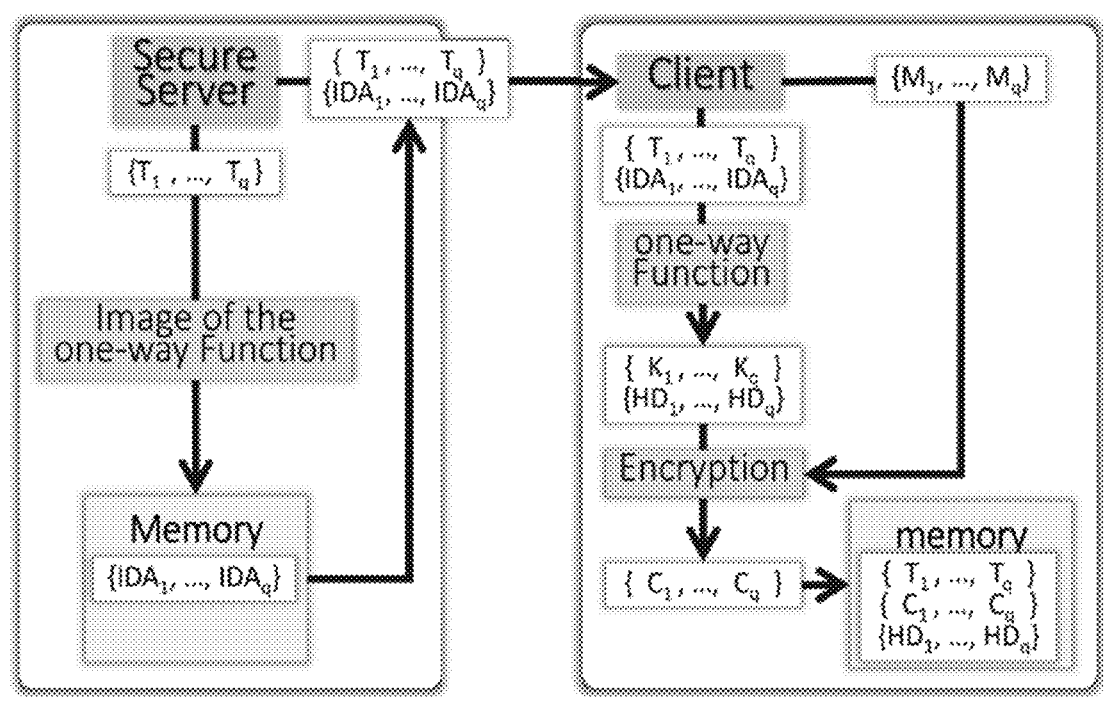
FIG. 3 depicts the downloading of encrypted messages to a client device equipped with a one-way unclonable function wherein the server generates the IDAccess through the image of the function.
Figure 4:
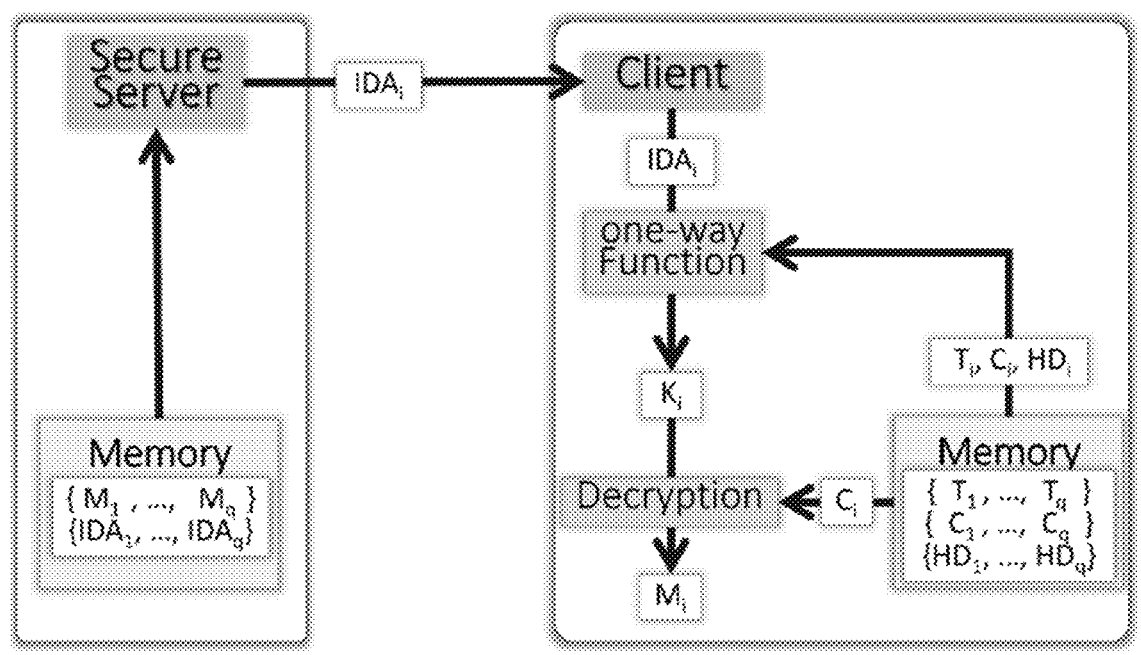
FIG. 4 depicts the decryption of messages by a client device equipped with a one-way unclonable function wherein the server transmits the IDAccess through an unsecure channel.

Referring now to FIG. 3, during a downloading cycle of q messages $\{M_1, \ldots, M_q\}$ by a client device, equipped with its one-way unclonable function, the server generates the set of random numbers $\{T_1, \ldots, T_q\}$, and the set of individual digital access parameters $\{IDA_1, \ldots, IDA_q\}$. The client device goes through the following steps:

i. Receive the set of q random numbers $\{T1, \ldots, Tq\}$; and associated individual digital access information $\{IDAccess1, \ldots, IDAccess\}$;

ii. Using these two pieces of information, and the one-way unclonable function (i.e., the client PUF), generate of a set of q keys $\{K1, \ldots, Kq\}$;

iii. In anticipation of possible errors of the one-way unclonable function, the client device can generate a set of q data helpers $\{DH1, \ldots, DHq\}$;

iv. The q messages $\{M1, \ldots, Mq\}$ are encrypted with the set of q keys $\{K1, \ldots, Kq\}$ to generate a set of q cipher texts $\{C1, \ldots, Cq\}$ v. The client device stores the q random numbers Ti, the q cipher texts Ci, and the q data helpers DHi.

Preferably, the client device deletes the initially received IDAccess numbers (IDA) and the server deletes the random numbers. The client also does not save the unencrypted files. At this point, the client device is in the same situation than the one described previously in reference to FIG. 2.

Decryption of the Files Stored by the Client Devices

The decryption cycle of message $M_i$ is initiated by the reception of the individual digital access information $IDA_i$. As shown in FIG. 4, $IDA_i$ can be delivered by the server. The server can also delegate the responsibility to dispatch IDAi to a representative. An example of embodiment of the decryption of Mi by the client device is the following:

i. Receive IDAi;

ii. Retrieve random number Ti, cipher text Ci, and data helper DHi;

iii. Generation of Ki from the one-way unclonable function;

iv. Decryption of Mi.

The hostile third party cannot decrypt $M_i$ without an image of the one-way unclonable function.

Exemplary Implementations of the Method

The secure storage of digital files enabled by the embodiments discussed above have a number of advantageous applications, such as those described below.

1) Per Paid Content Delivery.

In one embodiment, a digital media provider or other service provider enrolls a client device equipped with a PUF. The client device may a mobile device, a desktop computer, or a cable set top box. The service provider may then encrypt one or more digital files and store them on the client device according to the methods set forth above. Alternatively, the service provider can deliver several encrypted files containing information such as movies, music, apps, maps, and operating systems. At some point in the future, the user may receive IDAccess upon satisfaction of some condition, such as payment. The user (in possession of the client device) may access the preloaded digital file.

This embodiment may be particularly useful in circumstances where the client device is not capable of streaming digital content, for example, because of connectivity issues. For example, if the client device is in a limited bandwidth environment (e.g., on an airplane), there may still be sufficient bandwidth to permit receipt of IDAccess, which can unlock preloaded digital content.

2) Protected User Manuals/Flight Plans/Orders:

In another embodiment, the client may be pre-loaded with encrypted files or other information that is accessible only at certain times, or upon satisfaction of some condition. For example, the client may have pre-loaded and encrypted sets of instructions for a particular mission, which can vary as a function of a strategy that evolves due to changes in conditions. The users receive, as needed, the IDAccess to open a particular portion of the user manual, movement orders, etc. Thus, a controlling entity (e.g., command staff), may grant access to updated sets of orders held in devices in possession of field commanders or individual soldiers, on the fly, as conditions change. The full set of potential orders will remain encrypted and inaccessible to holders of the client devices, and so will not be compromised in the event of a loss of the device. An alternative example of an application of such a scheme will be pilots flying their plane, as it may not be desirable to lose the manual to hostile participants.

3) Session Key Recovery:

The message Mi can be a session key that is needed to get information from a service provider. The user uncovers the session key before reception of information from a service provider, or from a server. In such embodiment, it is contemplated that a client device will periodically receive IDAccess to decrypt a session key after a previous key expires with time.

4) Cooperative Users:

Thus far, examples having a server machine and a client machine have been discussed, but this arrangement is not limiting. In these previously described examples, it has been assumed that the client can recover the entirety of the key necessary to decrypt a previously encrypted file with IDAccess, but this is not a requirement. In an alternative arrangement, a first subkey recoverable by a first client must be combined in some way with a second key in order to decrypt file. All manners of combination are within the scope of the invention, e.g., concatenation, any mathematical bitwise operation, or XORing or other Boolean operations are usable. In these alternatives, the server may send to a first client IDAccess sufficient to recover a first subkey, and may send to a second client IDAccess sufficient to recover a second subkey. The two clients may then exchange subkeys, and the subkeys can be combined to result in a combined key sufficient to decrypt files kept on either or both clients. Thus, the full key is generated by knowing both subkeys. In alternative embodiments, preferred when the clients are in a hostile environment, the clients exchange a first and a second IDAccess messages (each received separately from the controlling device, i.e., the server). The two IDAccess messages are then combined (for example, in one of the manners previously described) by each device, to uncover the full key, which is used for secure communication.

5) Securing Interconnected IoTs: Nodes of IoTs such as controlling and metering elements in the grid, home hubs, smart sensors, are storing locally information that need to be constantly protected. The server can send to these nodes the pairs of random numbers and IDAccess to encrypt and store the information from the one-way function. When needed, on-demand, the server send again IDAccess to retrieve the information.

6) Authentication of the Server: When operating in a zero-trust environment, the server can concurrently send to the user the IDAccess that was previously used to encrypt and store file F, and a session key encrypted with the key that was used to encrypt F. If the server and the client device can communicate through messages encrypted with this key, the client device will know that the server possess an image of its one-way unclonable function.

7) Audit Tracking: In the event a client interacts with a public audit oracle, the IDAccess would be provided by the auditing oracle, serving as the second hardware authenticator for the information being audited. The user would provide the initial portion of the key, creating a two-factor authentication audit trail that the audit oracle controls.

8) Fragmented IDAccess: Multiple participants can send a fragment of the IDAccess to a client device, thereby creating a partnership between these participants in allowing the device to have access to the encrypted files.

9) One-Time Recovery Option: Once accessed, the file gets re-encrypted, and the mask information is destroyed so the file can never be accessed again with the same IDAccess.

10) Time Limit: Data can be recovered within a certain amount of time; otherwise, the mask information gets destroyed, and the file is never recoverable. In these embodiments, the client can apply a time stamp allowing it to begin counting time starting with a particular event, such as IDAccess. Alternatively, the server can keep time, starting at some event like the sending of IDAccess. If a certain amount of time passes from the time-starting event without the file being successfully decrypted, an alert condition can be declared by the server or the client. Additional information may be provided as part of IDAccess, or as separate information, enabling the client to determine whether decryption has been successful. An example of such information is a checksum of the plaintext of the file, which may be checked by the server against the checksum of the decrypted file to detect a match. Alternatively, the checksum could be sent from the client to server, and the comparison with the correct checksum could be done at the server. Upon declaration of an alert condition, certain threat mitigation actions can be taken. For example, the server can erase IDAccess or the client device can erase the cipher text past a certain time delay.

As was previously discussed above in the case of ReRAM or memristor based PUFs, interrogating or measuring these devices with probe currents that exceed some threshold (e.g., the forming threshold where semi-conductive filaments begin to form) may permanently change the physical characteristics of these devices. This means that in order for these devices to repeatably return the correct responses (i.e., the responses that were initially measured and stored in the PUF image), probe currents must be specified so that these devices do not have their resistances permanently changed by the formation of semi-permanent conductive paths. Suppose an attacker uncovers the message digest including A, the superset of addresses to be measured for key generation, but does not uncover masking information specifying the correct probe currents. Suppose further that the attacker has access to the PUF. In these circumstances, the attacker may attempt a brute force attack, by which the attacker sweeps all the addresses with a wide range of probe currents, to attempt to uncover the entire set of possible values used for key generation. In this event, the attack will likely permanently change or damage the PUF devices, permanently lowering their resistances by applying probe currents above the forming threshold.

This may be used to detect an attack and unauthorized access to the PUF. In certain embodiments, the client device may include a PUF verification process that periodically checks the resistance of certain devices (or all the devices in the array), with a probe current to measure their resistances. The resulting measurements may be threshold checked, to verify that they are below some resistance value. A threshold check is preferable to an exact resistance check, which would require that client to store at least a partial image of the PUF, but that possibility is also within the scope of the invention. In the event that a resistance threshold check reveals that one or more devices has been damaged, an alert condition can be declared, and one or more remedial actions can be taken. Example remedial actions may include destroying the PUF (e.g., by sweeping all devices with a high current probe), deleting all stored data including the random numbers and stored encrypted messages, refusing all communication with the server, or some combination of these.

These safety check routines may also be initiated from the server. In certain embodiments, the server may send to the client a PUF safety check message. In response, the client may probe the physical device characteristics of one or more devices (e.g., in the example above, by measuring resistance of a memristor or ReRAM with one or more specified probe currents). The resulting measurements may be sent back to the server for comparison with previously measured device characteristics. In the event of a mismatch, the server can direct the client to take one or more remedial steps such as those outlined above. Performing the comparison step at the server rather than the client has the advantage of not requiring that the client store even a partial image of expected responses.

The described features, advantages, and characteristics may be combined in any suitable manner in one or more embodiments. One skilled in the relevant art will recognize that the various embodiments may be practiced without one or more of the specific features or advantages of a particular embodiment. In other instances, additional features and advantages may be recognized in certain embodiments that may not be present in all embodiments.

It should be understood that, unless explicitly stated or otherwise required, the features disclosed in embodiments explicitly described herein and elsewhere in this disclosure may be used in any suitable combinations and using various suitable parameters. Thus, as a non-limiting example, any method described herein, or any other suitable method may be used to determine measurement parameters of for measuring the characteristics of PUF device. As a non-limiting example, the message length, the size of message fragments, address lengths, the size of PUF arrays used and other parameters may be varied as desired for different applications. It should also be understood that while specific types of PUF devices are discussed in the examples herein, they are intended as non-limiting examples of suitable PUF technologies.

The invention claimed is:

1. A system, comprising:
a server computing device having a processor, and memory coupled to the processor, the memory storing:
device image data representing previously measured physical device characteristics of a physical-unclonable-function ("PUF") array having a plurality of PUF devices, the PUF array belonging to a remote device; and
executable instructions that, when executed by the processor, cause the processor to:
generate a first set of processing instructions identifying a first set of PUF devices in the PUF array;
generate masking data identifying a second set of PUF devices in the first set of PUF devices, wherein the second set of PUF devices is a subset of the first set of PUF devices;
retrieve previously measured physical device characteristics of the PUF devices in the first set of PUF devices from the device image data;
use the retrieved previously measured physical device characteristics of the second set of PUF devices to encrypt a digital file;
send first information usable to generate the first processing instructions to the remote device as a first message digest, and send second information usable to recover the masking data to the remote device as a second message digest.

2. The system of claim 1, wherein the memory stores executable instructions that, when executed by the processor, cause the processor to:
generate a random number and generate the first processing instructions with a random number.

3. The system of claim 2, wherein the processor generates the first processing instructions with a random number by combining the random number with a password that is in the possession of the remote device.

4. The system of claim 3, wherein the processor further expands the combined random number and password to a predetermined bit length using an extended output function.

5. The system of claim 4, wherein the processor further subjects the expanded combined random number and password to a cryptographic hash function to result in the first processing instructions.

6. The system of claim 3, wherein the processor combines the random number with a password in possession of the client by XORing the random number and the password in possession of the client.

7. The system of claim 2, wherein the first information sent to the remote device is the random number.

8. The system of claim 1, wherein the second set of PUF devices is selected randomly within the first set of PUF devices, and wherein a number of the second set of PUF devices is selected to generate a bitstream of previously measured physical device characteristics of the second set of PUF devices having a predetermined length sufficient to be used as an encryption key by a predetermined encryption algorithm.

9. The system of claim 8, wherein the memory includes further computer executable instructions that, when executed by the processor cause the processor to, use the retrieved previously measured physical device characteristics of the second set of PUF devices as an encryption key.

10. The system of claim 1, wherein the second information is usable to recover measurement conditions under which the previously measured physical device characteristics of the PUF devices in the second set of PUF devices were measured to generate device image data for the second set of PUF devices.

11. The system of claim 1, wherein the second information is generated by encrypting the masking data identifying a second set of PUF devices.

12. The system of claim 10, wherein encrypting the masking data comprises XORing the masking data with address information identifying the first set of PUF devices in the PUF array.

13. The system of claim 1, wherein the device image data representing previously measured physical device characteristics of a physical-unclonable-function ("PUF") array of PUF devices encodes physical device characteristics of each PUF device as having a 0, 1 or X state, and wherein the masking information identifies devices having the X state.

14. The system of claim 13, wherein the X state indicates that a device has an erratic response.

15. A method of managing access to an encrypted file, comprising:
at a server computing device having a processor, and memory coupled to the processor, the memory storing device image data representing previously measured physical device characteristics of a physical-unclonable-function ("PUF") array having a plurality of PUF devices, the PUF array belonging to a client computing device:
generating a random number;
combining the random number and a password in possession of the client computing device, and deriving, from the resulting combination, a first list of addresses of PUF devices in the array;
generating masking data selecting a second list of addresses of devices in the PUF array within the first list of devices, the number of addresses in the second list being less than the number in the first list;
retrieving, from the device image data, previously measured physical responses of the devices in the second list, resulting in a first response bitstream;
encrypting a digital file using the first response bitstream;
sending the random number to the client computing device as a first message digest;
encrypting the masking data with the first list of addresses, and sending the encrypted masking data to the client computing device as a second message digest;
deleting all versions of the digital file and the random number;
at the client:
receiving the encrypted digital file and the first message digest;
using the random number and the first message digest to generate the first list of addresses of PUF devices in the array;
measuring physical device characteristics of the devices identified in the first list of addresses;
receiving the second message digest;
decrypting the second message digest with the first list of addresses to recover the masking data;
applying the masking data to select measured physical device characteristics of only the devices having addresses in the second list of addresses, resulting in a second response bitstream;
using the second response bitstream to decrypt the digital file.

* * * * *